United States Patent
Benjamin et al.

(10) Patent No.: US 11,513,721 B2
(45) Date of Patent: Nov. 29, 2022

(54) METHOD AND SYSTEM FOR PERFORMANCE CONTROL IN A CLOUD COMPUTING ENVIRONMENT

(71) Applicant: VMware, Inc., Palo Alto, CA (US)

(72) Inventors: Emad Benjamin, San Jose, CA (US); Michael Gasch, Leipzig (DE); Daniel Linsley, Sacramento, CA (US); Frank Carta, Seattle, WA (US); Greg Lavender, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 185 days.

(21) Appl. No.: 16/842,681

(22) Filed: Apr. 7, 2020

(65) Prior Publication Data
US 2021/0311655 A1 Oct. 7, 2021

(51) Int. Cl.
*G06F 3/06* (2006.01)
(52) U.S. Cl.
CPC ............ *G06F 3/0653* (2013.01); *G06F 3/067* (2013.01); *G06F 3/0614* (2013.01); *G06F 3/0631* (2013.01); *G06F 3/0683* (2013.01)
(58) Field of Classification Search
CPC ............ G06F 9/50; G06F 9/5011; G06F 9/5016–5022; G06F 9/5027–5044; G06F 2209/5022; G06F 2209/503; G06F 2209/504; G06F 3/0653; G06F 3/0614; G06F 3/0631; G06F 3/067; G06F 3/0683
See application file for complete search history.

(56) References Cited

U.S. PATENT DOCUMENTS

| | | | | |
|---|---|---|---|---|
| 9,804,890 B1* | 10/2017 | Pai | ........................... | G06F 9/50 |
| 10,097,410 B2* | 10/2018 | Singh | ................. | G06F 9/45558 |
| 10,476,742 B1* | 11/2019 | Szarvas | ............... | H04L 41/0896 |
| 11,307,895 B2* | 4/2022 | Novak | .................. | G06F 9/5077 |
| 2010/0115515 A1* | 5/2010 | Drabant | ................ | G06F 9/5038 |
| | | | | 718/100 |
| 2015/0058265 A1* | 2/2015 | Padala | ................ | G06F 9/45558 |
| | | | | 706/12 |
| 2015/0381711 A1* | 12/2015 | Singh | ..................... | H04L 41/12 |
| | | | | 709/221 |
| 2017/0353888 A1* | 12/2017 | Weckstrom | ........... | H04W 28/08 |
| 2018/0067778 A1* | 3/2018 | Hawilo | ................ | G06F 9/5033 |

OTHER PUBLICATIONS

M. Katyal and A. Mishra, "Orchestration of cloud computing virtual resources," 2014 International Conference on Contemporary Computing and Informatics (IC3I), 2014 (Year: 2014).*

(Continued)

*Primary Examiner* — Khoa D Doan
(74) *Attorney, Agent, or Firm* — Loza & Loza, LLP

(57) ABSTRACT

System and method for performance control in a cloud computing environment uses dependency hierarchy between software entities executing in the cloud computing environment and operational status of each of the software entities executing in the cloud computing environment. Using the dependency hierarchy between the software entities and the operational status of each of the software entities, a scaling operation is performed to the virtual computing instances such that a service-level objective (SLO) of the cloud computing environment satisfies a predetermined threshold.

20 Claims, 10 Drawing Sheets

(56) References Cited

OTHER PUBLICATIONS

X. Yu, Q. Yong, Y. Dai, J. Ren, X. Wang and S. Yi, "A Low Overhead and Reliable Nested Virtualization VMM for Cloud Computing," 2013 10th Web Information System and Application Conference, 2013, pp. 400-405, doi: 10.1109/WISA.2013.82. (Year: 2013).*

P. C. Hershey, S. Rao, C. B. Silio and A. Narayan, "System of Systems for Quality-of-Service Observation and Response in Cloud Computing Environments," in IEEE Systems Journal, vol. 9, No. 1, pp. 212-222, Mar. 2015, doi: 10.1109/JSYST.2013.2295961. (Year: 2015).*

VMware Inc. "VMware HCX: Application Migration and Mobility Platform", https://hcx.vmware.com, retrieved Aug. 26, 2020, 8 pgs.

VMware Inc., "Wavefront by VMware: Cloud-Native Monitoring with Real-Time Analytics", https://www.wavefront.com/, retrieved Aug. 26, 2020, 9 pgs.

VMware, Inc., "Office of the CTO Perspective: Application Enabled Infrastructure—Practical Cloud Native and Rise of Application Platforms", https://octo.vmware.com/vmware-octo-application-platfomns-position-paper, May 6, 2019, 22 pgs.

* cited by examiner

BMAP [8,3,7] [6,5] [4,2] [1]

DMAP 1: 7, 5, 2, 3, 7, 8, 6, 4
2: 7, 5
3: /
4: 7, 8, 6
5: 7
6: 7, 8
7: /
8: /

720 → BMAP [8,3,7] [6,5] [4,2] [1]

730 → DMAP 1: 7, 5, 2, 3, 7, 8, 6, 4
2: 7, 5
3: /
4: 7, 8, 6
5: 7
6: 7, 8
7: /
8: /

940 → UMAP 5, 2, 3, 4
950 → SMAP 5, 3, 4

METHOD AND SYSTEM FOR PERFORMANCE CONTROL IN A CLOUD COMPUTING ENVIRONMENT

BACKGROUND

Growing adoption of cloud native applications allows enterprises to move to distributed application architectures (e.g., n-tier or microservice deployments) as a means to increase software development velocity and time to market. However, such adoption of cloud native applications comes with tradeoffs. For example, in-memory function calls that are assisted and optimized for local execution by integrated development environments (IDEs), compilers and runtimes are replaced by remote communication and all its intricacies, which leads to increased complexity in both software development lifecycle (SDLC) and related operational processes. Developers and operators have to take additional responsibility to ensure the performance, scalability, resiliency, efficiency, integrity and security for deeply interconnected applications in dynamic environments.

To tackle the aforementioned challenges of distributed systems, a whole new ecosystem of cloud native tools, such as Kubernetes and service mesh, have emerged. However, these cloud native tools fall short in addressing the aforementioned challenges of distributed systems in their entirety. Whereas some enterprises have built highly customized platforms and runtimes tailored for their unique needs, traditional enterprises are struggling with building customized platforms and runtimes. Specifically, traditional enterprises can carry a lot of technical debt ("legacy") and typically do not have the engineering bandwidth or experience to provide a similar experience to their developers. For example, for traditional enterprises that attempt to modernize parts of their application platforms, e.g., by introducing microservices or cloud services, these traditional enterprises are faced with chasing Service-Level Objective (SLO) issues (e.g., response times issues) that are difficult to troubleshoot. Therefore, there is a need to provide an automated approach of a predictable SLO (e.g., response time) for software services in a multi-cloud environment

SUMMARY

System and method for performance control in a cloud computing environment uses dependency hierarchy between software entities executing in the cloud computing environment and operational status of each of the software entities executing in the cloud computing environment. Using the dependency hierarchy between the software entities and the operational status of each of the software entities, a scaling operation is performed to the virtual computing instances such that an SLO of the cloud computing environment satisfies a predetermined threshold.

A computer-implemented method for performance control in a cloud computing environment in accordance with an embodiment of the invention comprises determining dependency hierarchy between software entities executing in the cloud computing environment, determining operational status of each of the software entities executing in the cloud computing environment, and in response to the dependency hierarchy between the software entities and the operational status of each of the software entities, performing a scaling operation to the software entities such that an SLO of the cloud computing environment satisfies a predetermined threshold. In some embodiments, the steps of this method are performed when program instructions contained in a non-transitory computer-readable storage medium are executed by one or more processors.

A system for performance control in a cloud computing environment in accordance with an embodiment of the invention comprises memory and at least one processor configured to determine dependency hierarchy between software entities executing in the cloud computing environment, determine operational status of each of the software entities executing in the cloud computing environment, and in response to the dependency hierarchy between the software entities and the operational status of each of the software entities, perform a scaling operation to the software entities such that an SLO of the cloud computing environment satisfies a predetermined threshold.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," "one aspect," "an aspect," "various aspects," or similar language means that a particular feature, structure, or characteristic described in connection with the indicated embodiment is included in at least one embodiment of the present invention. Thus, the phrases "in one embodiment," "in an embodiment," "in one aspect," "in an aspect," "in various aspects," and similar language throughout this specification may, but do not necessarily, all refer to the same embodiment.

Figure 1:
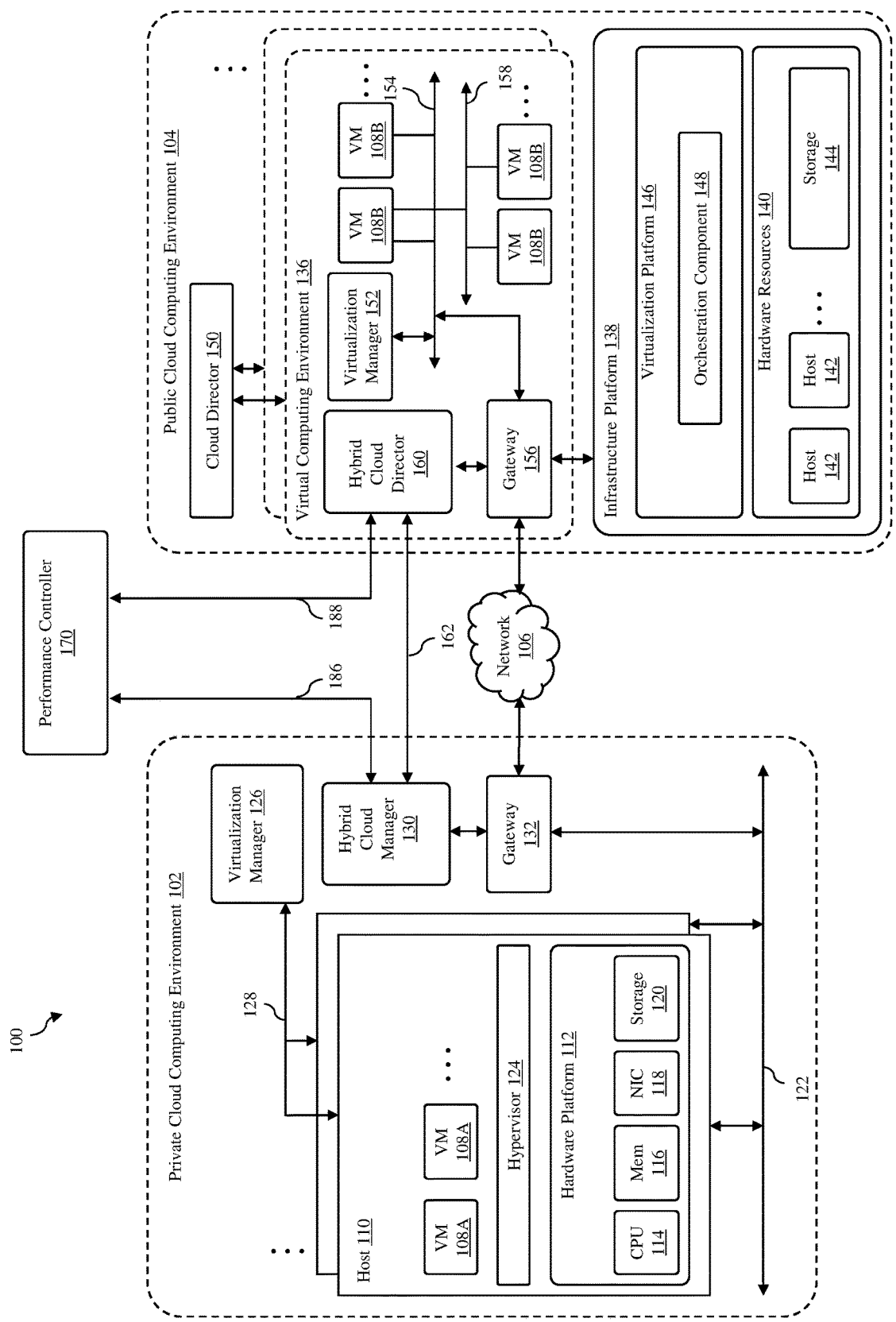
FIG. 1 is a block diagram of a hybrid cloud system that may be used to describe a method and system for performance control in accordance with various aspects of the invention.

Turning now to FIG. 1, a block diagram of a hybrid cloud system 100 in which the present invention may be implemented in accordance with an embodiment of the invention is shown. The hybrid cloud system 100 includes at least one private cloud computing environment 102 and at least one public cloud computing environment 104 that are connected via a network 106. The hybrid cloud system 100 is configured to provide a common platform for managing and executing commands, instructions, and/or workloads seamlessly between the private and public cloud computing environments. In one embodiment, the private cloud computing environment 102 may be controlled and administrated by a particular enterprise or business organization, while the public cloud computing environment 104 may be operated by a cloud computing service provider and exposed as a service available to account holders, such as the particular enterprise in addition to other enterprises. In some embodiments, the private cloud computing environment 102 may be a private or on-premise data center. The hybrid cloud system can be used in cloud computing and cloud storage systems for offering software as a service (SaaS) cloud services. Examples of cloud architectures include the VMware Cloud architecture software, Amazon EC2™ web service, and OpenStack™ open source cloud computing service. SaaS cloud service is a type of software distribution cloud service in which a service provider hosts software applications for customers in a cloud environment.

The private cloud computing environment 102 and the public cloud computing environment 104 of the hybrid cloud system 100 include computing and/or storage infrastructures to support a number of virtual computing instances 108A and 108B. As used herein, the term "virtual computing instance" refers to any software processing entity that can run on a computer system, such as a software application, a software process, a VM, e.g., a VM supported by virtualization products of VMware, Inc., and a software "container", e.g., a Docker container. In some embodiments of this disclosure, the virtual computing instances will be described as being virtual machines, although embodiments of the invention described herein are not limited to virtual machines.

Continuing to refer to FIG. 1, the private cloud computing environment 102 of the hybrid cloud system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other I/O devices such as, for example, a mouse and a keyboard (not shown). The processor 114 is configured to execute instructions such as, for example, executable instructions that may be used to perform one or more operations described herein and may be stored in the memory 116 and the storage system 120. The memory 116 is volatile memory used for retrieving programs and processing data. The memory 116 may include, for example, one or more random access memory (RAM) modules. The network interface 118 enables the host 110 to communicate with another device via a communication medium, such as a network 122 within the private cloud computing environment. The network interface 118 may be one or more network adapters, also referred to as a Network Interface Card (NIC). The storage system 120 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system 120 is used to store information, such as executable instructions, cryptographic keys, virtual disks, configurations and other data, which can be retrieved by the host.

Each host 110 may be configured to provide a virtualization layer that abstracts processor, memory, storage, and networking resources of the hardware platform 112 into the virtual computing instances, e.g., the virtual machines 108A, that run concurrently on the same host. The virtual machines run on top of a software interface layer, which is referred to herein as a hypervisor 124, that enables sharing of the hardware resources of the host by the virtual machines. One example of the hypervisor 124 that may be used in an embodiment described herein is a VMware ESXi™ hypervisor provided as part of the VMware vSphere® solution made commercially available from VMware, Inc. The hypervisor 124 may run on top of the operating system of the host or directly on hardware components of the host. For other types of virtual computing instances, the host may include other virtualization software platforms to support those virtual computing instances, such as Docker virtualization platform to support software containers.

The private cloud computing environment 102 includes a virtualization manager 126 that communicates with the hosts 110 via a management network 128. In one embodiment, the virtualization manager 126 is a computer program that resides and executes in a computer system, such as one of the hosts, or in a virtual computing instance, such as one of the virtual machines 108A running on the hosts. One example of the virtualization manager 126 is the VMware vCenter Server® product made available from VMware, Inc. The virtualization manager 126 is configured to carry out administrative tasks for the private cloud computing environment, including managing the hosts, managing the VMs running within each host, provisioning VMs, migrating VMs from one host to another host, and load balancing between the hosts.

In one embodiment, the virtualization manager 126 includes a hybrid cloud manager 130 configured to manage and integrate computing resources provided by the private cloud computing environment 102 with computing resources provided by the public cloud computing environment 104 to form a unified "hybrid" computing platform. The hybrid cloud manager is configured to deploy virtual computing instances, e.g., virtual machines 108A, in the private cloud computing environment, transfer VMs from the private cloud computing environment to the public cloud computing environment 104, and perform other "cross-cloud" administrative tasks. In one implementation, the hybrid cloud manager 130 is a module or plug-in to the virtualization manager 126, although other implementations may be used, such as a separate computer program executing in any computer system or running in a virtual machine in one of the hosts.

In one embodiment, the hybrid cloud manager 130 is configured to control network traffic into the network 106 via a gateway device 132, which may be implemented as a virtual appliance. The gateway device 132 is configured to provide the virtual machines 108A and other devices in the private cloud computing environment 102 with connectivity to external devices via the network 106. The gateway device 132 may manage external public Internet Protocol (IP) addresses for the virtual machines 108A and route traffic incoming to and outgoing from the private cloud computing environment and provide networking services, such as firewalls, network address translation (NAT), dynamic host configuration protocol (DHCP), load balancing, and virtual private network (VPN) connectivity over the network 106.

The public cloud computing environment 104 of the hybrid cloud system 100 is configured to dynamically provide an enterprise (or users of an enterprise) with one or more virtual computing environments 136 in which an administrator of the enterprise may provision virtual computing instances, e.g., the virtual machines 108B, and install and execute various applications in the virtual computing instances. The public cloud computing environment 104 includes an infrastructure platform 138 upon which the virtual computing environments can be executed. In the particular embodiment of FIG. 1, the infrastructure platform 138 includes hardware resources 140 having computing resources (e.g., hosts 142), storage resources (e.g., one or more storage array systems, such as a storage area network (SAN) 144), and networking resources (not illustrated), and a virtualization platform 146, which is programmed and/or configured to provide the virtual computing environments 136 that support the virtual machines 108B across the hosts 142. The virtualization platform 146 may be implemented using one or more software programs that reside and execute in one or more computer systems, such as the hosts 142, or in one or more virtual computing instances, such as the virtual machines 108B, running on the hosts.

In one embodiment, the virtualization platform 146 includes an orchestration component 148 that provides infrastructure resources to the virtual computing environments 136 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 102, the virtualization platform may be implemented by running on the hosts 142 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 104.

In one embodiment, the public cloud computing environment 104 may include a cloud director 150 that manages allocation of virtual computing resources to an enterprise. The cloud director may be accessible to users via a REST (Representational State Transfer) API (Application Programming Interface) or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 148 to instantiate the requested virtual machines (e.g., the virtual machines 108B). One example of the cloud director is the VMware vCloud Director® product from VMware, Inc. The public cloud computing environment 104 may be VMware cloud (VMC) on Amazon Web Services (AWS).

In one embodiment, at least some of the virtual computing environments 136 may be configured as virtual data centers. Each virtual computing environment includes one or more virtual computing instances, such as the virtual machines 108B, and one or more virtualization managers 152. The virtualization managers 152 may be similar to the virtualization manager 126 in the private cloud computing environment 102. One example of the virtualization manager 152 is the VMware vCenter Server® product made available from VMware, Inc. Each virtual computing environment may further include one or more virtual networks 154 used to communicate between the virtual machines 108B running in that environment and managed by at least one networking gateway device 156, as well as one or more isolated internal networks 158 not connected to the gateway device 156. The gateway device 156, which may be a virtual appliance, is configured to provide the virtual machines 108B and other components in the virtual computing environment 136 with connectivity to external devices, such as components in the private cloud computing environment 102 via the network 106. The gateway device 156 operates in a similar manner as the gateway device 132 in the private cloud computing environment.

In one embodiment, each virtual computing environments 136 includes a hybrid cloud director 160 configured to communicate with the corresponding hybrid cloud manager 130 in the private cloud computing environment 102 to enable a common virtualized computing platform between the private and public cloud computing environments. The hybrid cloud director may communicate with the hybrid cloud manager using Internet-based traffic via a VPN tunnel established between the gateways 132 and 156, or alternatively, using a direct connection 162. The hybrid cloud director and the corresponding hybrid cloud manager facilitate cross-cloud migration of virtual computing instances, such as virtual machines 108A and 108B, between the private and public computing environments. This cross-cloud migration may include both "cold migration" in which the virtual machine is powered off during migration, as well as "hot migration" in which the virtual machine is powered on during migration. As an example, the hybrid cloud director 160 may be a component of the HCX-Cloud product and the hybrid cloud manager 130 may be a component of the HCX-Enterprise product, which are provided by VMware, Inc.

Referring still to FIG. 1, in one embodiment, the hybrid cloud system 100 includes a performance controller 170 configured to control the performance of the hybrid cloud system 100. In some embodiments, the performance controller 170 is configured to control the performance of the hybrid cloud system 100 such that an SLO of an application executing in the hybrid cloud system 100 can be satisfied. For example, the performance controller 170 controls response time of an application having virtual computing instances 108A and/or 108B in the hybrid cloud system 100 to be below a predefined response time threshold. In some embodiments, an SLO of an application is made of multiple Service-Level Indicators (SLIs), where each SLI tracks the threshold and metrics of a singular service or software entity.

The performance controller 170 may be located in the private cloud environment 102, the public cloud computing environment 104 and/or elsewhere in the hybrid cloud system 100. In some embodiments, the performance controller 170 is distributed in multiple cloud computing environments in the hybrid cloud system 100, e.g., extending from the private cloud environment 102 to the public cloud computing environment 104. For example, the performance controller 170 may be a component of the hybrid cloud manager 130 of the private cloud environment 102 and/or a component of the hybrid cloud director 160 of the public cloud computing environment 104. The performance controller 170 may operate or execute on at least one host computer, which may be similar to or same as the hosts 110 in the private cloud computing environment 102 and/or the hosts 142 in the public cloud computing environment 104. In an embodiment, the performance controller 170 communicates with the hybrid cloud manager 130 of the private cloud computing environment 102 using a direct connection 186. However, in other embodiments, the performance controller 170 communicates with the hybrid cloud manager 130 through an indirect connection, or through a combination of direct and indirect connections. In an embodiment, the performance controller 170 also communicates with the hybrid cloud director 160 of the public cloud computing environment 104 using a direct connection 188. However, in other embodiments, the performance controller 170 communicates with the hybrid cloud director 160 through an indirect connection or a combination of direct and indirect connections. In some embodiments, the performance controller 170 is a component of a hybrid cloud runtime configured to manage one or more hybrid cloud computing environments (e.g., the private cloud environment 102 and the public cloud computing environment 104) in the hybrid cloud system 100. The performance controller 170 can perform a scaling operation (e.g., a scale up operation to increase software processing capacity) to the virtual computing instances 108A and/or 108B such that an SLO of the hybrid cloud system 100 satisfies a predetermined threshold. For example, the performance controller 170 can scale one or more virtual computing instances 108A and/or 108B to keep the overall response time of the virtual computing instances 108A and/or 108B at a level that is below a threshold response time.

Figure 2:
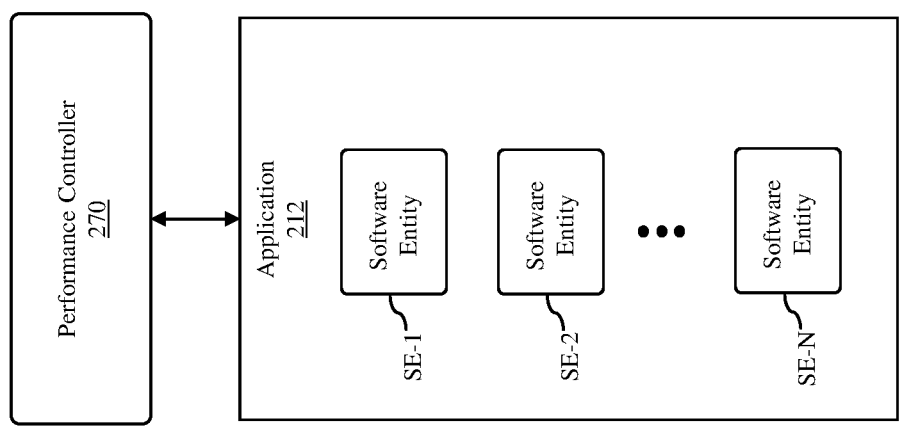
FIG. 2 depicts a performance controller that controls the performance of an application executing in the hybrid cloud system depicted in FIG. 1.

FIG. 2 depicts a performance controller 270 that controls an application 212 executing in the hybrid cloud system 100 depicted in FIG. 1. The application 212 may include a logical collection of software entities executing in one or more cloud computing environments (e.g., the private cloud computing environment 102 and/or the public cloud computing environment 104) in the hybrid cloud system 100. As used herein, the term "software entity" refers to any virtual computing instance (e.g., the virtual computing instances 108A and/or 108B depicted in FIG. 1) or software processing entity that can run on a computer system, such as a software application, a software process, a VM, e.g., a VM supported by virtualization products of VMware, Inc., and a software "container", e.g., a Docker container. In the embodiment depicted in FIG. 2, the application 212 includes one or more software entities SE-1, SE-2, . . . , SE-N, where N is a positive integer, executing in the hybrid cloud system 100. The software entities SE-1, SE-2, . . . , SE-N in the application 212 may communicate with each other through a service mesh, which is a dedicated infrastructure layer that controls service-to-service communication. In some embodiments, the software entities SE-1, SE-2, . . . , SE-N in the application 212 is controlled and administrated by a particular enterprise or business organization.

The software entities SE-1, SE-2, . . . , SE-N in the application 212 may be disposed anywhere within the hybrid cloud system 100. For example, the software entities SE-1, SE-2, . . . , SE-N in the application 212 may be disposed in the private cloud computing environment 102 and/or the public cloud computing environment 104 or outside of the private cloud computing environment 102 and/or the public cloud computing environment 104. In some embodiments, all of the software entities SE-1, SE-2, . . . , SE-N in the application 212 are located in the same cloud computing environment of the hybrid cloud system 100. For example, in some embodiments, all of the software entities SE-1, SE-2, . . . , SE-N in the application 212 execute in the private cloud computing environment 102 or execute in the public cloud computing environment 104. In some embodiments, the software entities SE-1, SE-2, . . . , SE-N in the application 212 are located in different clouds of the hybrid cloud system 100. For example, in some embodiments, at least one of the software entities SE-1, SE-2, . . . , SE-N executes in the private cloud computing environment 102 and the rest of the software entities SE-1, SE-2, . . . , SE-N execute in the public cloud computing environment 104.

The performance controller 270 depicted in FIG. 2 is an embodiment of the performance controller 170 depicted in FIG. 1. In some embodiments, the performance controller 270 is configured to control the software entities SE-1, SE-2, . . . , SE-N of the application 212 such that an SLO of the software entities SE-1, SE-2, . . . , SE-N of the application 212 satisfies a predetermined threshold (e.g., to be equal to, above, or below the predetermined threshold). For example, the performance controller 270 controls the overall response time of the software entities SE-1, SE-2, . . . , SE-N of the application 212 to be below a predetermined response time threshold. In an embodiment, the performance controller 270 is configured to determine dependency hierarchy between the software entities SE-1, SE-2, . . . , SE-N, determine operational status of each of the software entities SE-1, SE-2, . . . , SE-N executing in the hybrid cloud system 100, and in response to the dependency hierarchy between the software entities SE-1, SE-2, . . . , SE-N and the operational status of each of the software entities SE-1, SE-2, . . . , SE-N, perform a scaling operation to the software entities SE-1, SE-2, . . . , SE-N such that an SLO of the hybrid cloud system 100 satisfies a predetermined threshold. For example, the performance controller 270 is configured to perform a scaling operation (e.g., a scale up operation to increase software processing capacity) to the software entities SE-1, SE-2, . . . , SE-N such that application response time of the hybrid cloud system 100 is below a predetermined threshold. By scaling one or more the software entities SE-1, SE-2, . . . , SE-N based on the dependency hierarchy between the software entities SE-1, SE-2, . . . , SE-N and the operational status of each of the software entities SE-1, SE-2, . . . , SE-N, the SLO of the hybrid cloud system 100 can be maintained at a specific level (e.g., to be equal to, above, or below a predetermined threshold).

In some embodiments, the performance controller 270 performs a scaling operation to one of the software entities SE-1, SE-2, . . . , SE-N that is located at bottom of the dependency hierarchy between the software entities SE-1, SE-2, . . . , SE-N. The performance of a software entity that is dependent from another software entity can be affected by the performance of that other software entity. For example, the performance of a software entity that is located at top of the dependency hierarchy between the software entities SE-1, SE-2, . . . , SE-N can be affected by the performance of a software entity that is located at bottom of the dependency hierarchy between the software entities SE-1, SE-2, . . . , SE-N. In an embodiment, the performance controller 270 identifies a first software entity and a second software entity of the software entities SE-1, SE-2, . . . , SE-N as unhealthy software entities, where the first software entity is dependent upon the second software entity (e.g., the output of the second software entity being an input of the first software entity). In this example, the performance controller 270 only performs the scaling operation to the second software entity, not to the first software entity. In some embodiments, the performance controller 270 determines whether one of the software entities SE-1, SE-2, . . . , SE-N executing in the cloud computing environment is in a scaling grace period and exempts the software entity that is in the scaling grace period from the scaling operation. Using a scaling grace period for a specific software entity enables fine-grained control (e.g., per service control) over scaling policies.

Figure 3:
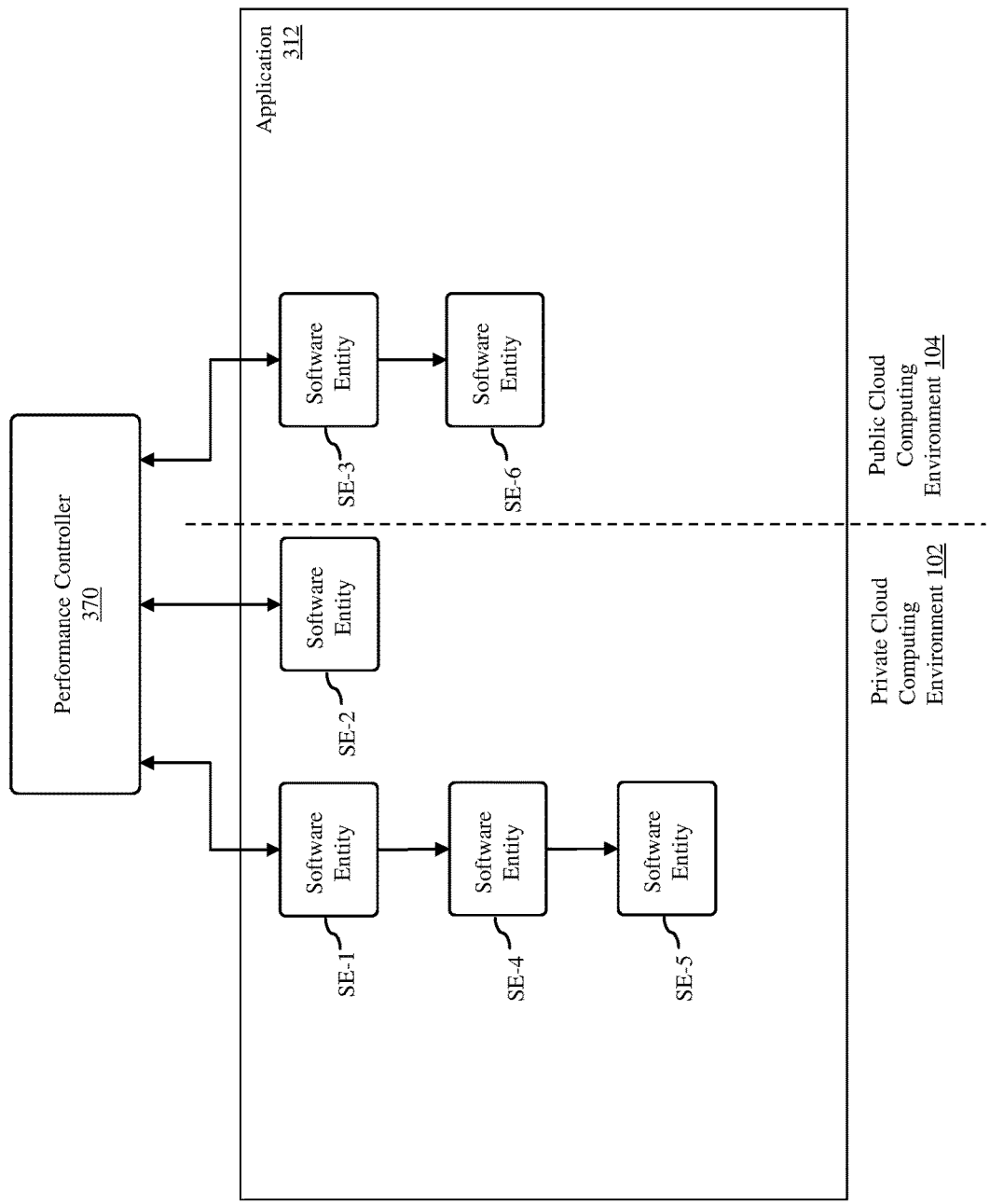
FIG. 3 depicts a performance controller that controls the performance of an application that spans across a private cloud computing environment and a public cloud computing environment of the hybrid cloud system depicted in FIG. 1.

FIG. 3 depicts a performance controller 370 that controls the performance of an application 312 that spans across the private cloud computing environment 102 and the public cloud computing environment 104 of the hybrid cloud system 100 depicted in FIG. 1. The performance controller 370 depicted in FIG. 3 is an embodiment of the performance controller 270 depicted in FIG. 2 and the application 312 depicted in FIG. 3 is an embodiment of the application 212 depicted in FIG. 2. In the embodiment depicted in FIG. 3, the application 312 includes six software entities SE-1, SE-2, . . . , SE-6 that execute in the hybrid cloud system 100. However, the number of software entities included in the application 312 can be more or less than six software entities. The software entities SE-1, SE-2, . . . , SE-6 included in the application 312 execute in multiple cloud environments. For example, the software entities SE-1, SE-2, SE-4, SE-5 execute in the private cloud computing environment 102 and the software entities SE-3, SE-6 execute in the public cloud computing environment 104. However, the cloud locations in which the software entities SE-1, SE-2, . . . , SE-6 of the application 312 execute are not limited to the example shown in FIG. 3.

In the embodiment depicted in FIG. 3, the software entities SE-1, SE-2, . . . , SE-6 have a specific dependency hierarchy or topology. In particular, the software entity SE-1 is dependent from the software entity SE-4 (e.g., the output of the software entity SE-4 being an input of the software entity SE-1) and the software entity SE-4 is dependent from the software entity SE-5 (e.g., the output of the software entity SE-5 being an input of the software entity SE-4). In addition, in the embodiment depicted in FIG. 3, no software entity is dependent from the software entity SE-2 and the software entity SE-3 is dependent from the software entity SE-6 (e.g., the output of the software entity SE-6 being an input of the software entity SE-3). However, the dependency hierarchy of the software entities SE-1, SE-2, . . . , SE-6 included in the application 312 is not limited to the example illustrated in FIG. 3. The performance of a software entity that is dependent from another software entity can be affected by the performance of that other software entity. For example, the performance of the software entity SE-1 can be affected by the performance of the software entity SE-4 and the performance of the software entity SE-5, the performance of the software entity SE-4 can be affected by the performance of the software entity SE-5, and the performance of the software entity SE-3 can be affected by the performance of the software entity SE-6. In some embodiments, to control a performance metric (e.g., the response time) of the application 312, the performance controller 370 adjusts the operation of a software entity at the bottom of dependency hierarchy. For example, instead of adjusting the operation of the software entity SE-1, the performance controller 370 adjusts the operation of the software entity SE-5 (e.g., scales up or down the software entity SE-5). In another example, instead of adjusting the operation of the software entity SE-3, the performance controller 370 adjusts the operation of the software entity SE-6 (e.g., scales up or down the software entity SE-6).

Figure 4:
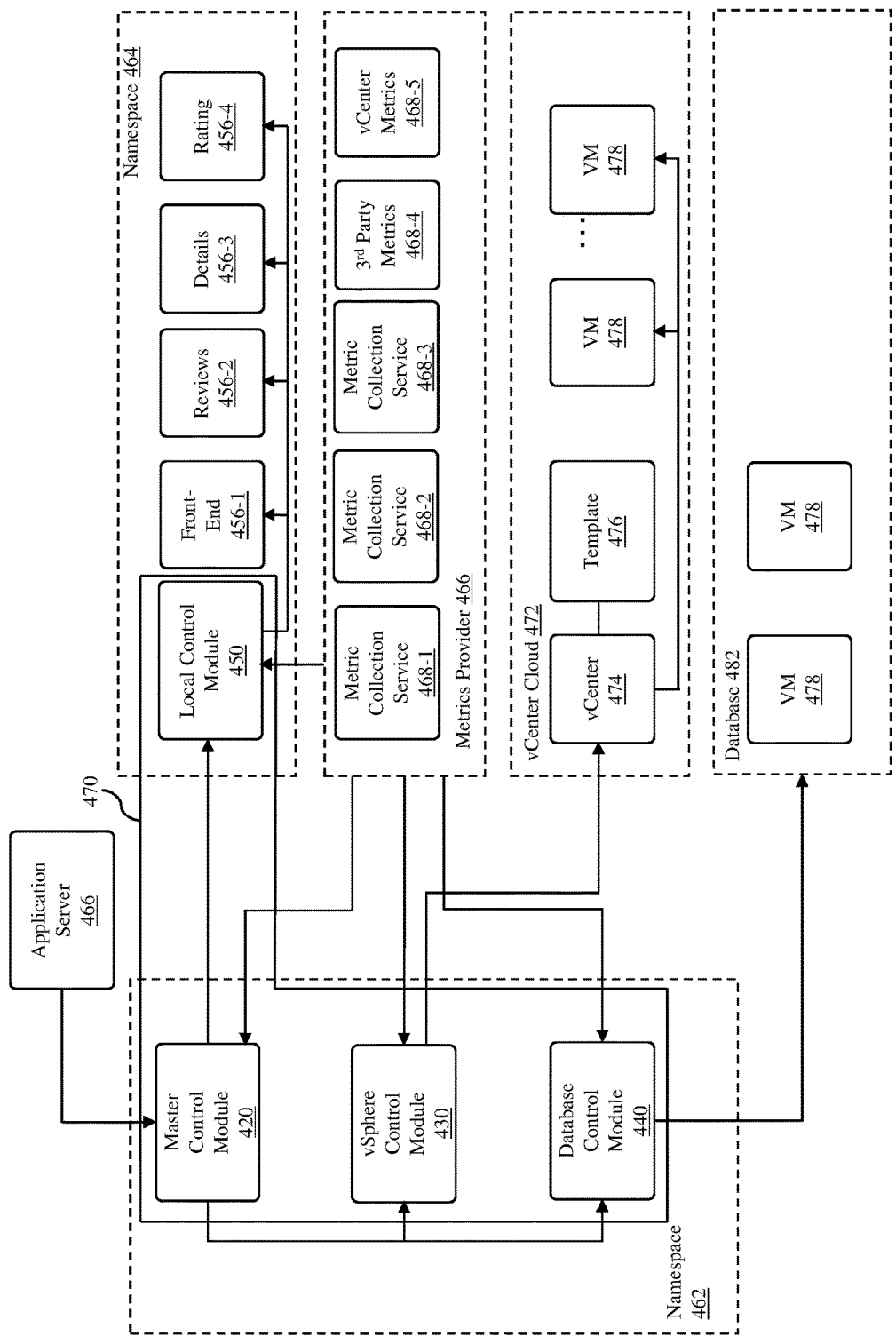
FIG. 4 depicts a performance controller that is distributed in multiple namespaces/cloud environments and includes master and specialized control modules.

In some embodiments, the performance controller 270 is distributed in multiple cloud environments and includes master and specialized performance controllers. FIG. 4 depicts a performance controller 470 that is distributed in multiple namespaces/cloud environments 462, 464 and includes master and specialized performance modules 420, 430, 440, 450. To support multi-cloud environments, the performance controller 470 uses different control modules 420, 430, 440, 450 to implement cloud-specific scaling logic. In the embodiment depicted in FIG. 4, the performance controller 470 includes a master control module 420 that can be initialized or instantiated by an application server 466 or an application programming interface (API), a VMware vSphere® control module 430, a database control module 440, and a local control module 450. The vSphere control module 430 and the database control module 440, and the local control module 450 can be initialized or instantiated by the master control module 420. The master control module 420, the vSphere control module 430, and the database control module 440 are located in the namespace 462 and the local control module 450 is located in the namespace 464. In addition to the local control module 450, software applications/services 456-1, 456-2, 456-3, 456-4 are also located in the namespace 464 and are controlled by the local control module 450. The performance controller 470 is pluggable and allows different metrics providers to support various cloud environments. In the embodiment depicted in FIG. 4, a metrics provider 466, which includes different metric collection services 468-1, 468-2, 468-3, 468-4, 468-5, provides application/service operational metrics to the master control module 420, the vSphere control module 430, the database control module 440, and the local control module 450. A VMware® vCenter™ cloud 472, which hosts VMware® vCenter™ server 474, template 476, and one or more virtual machines 478, is controlled by the vSphere control module 430. A database cloud 482, which includes one or more virtual machines 478, is controlled by the database control module 440. The virtual machines 478 may be the same as or similar to the virtual machines 108A, 108B depicted in FIG. 1. In addition to the control modules, other control functions can be implemented in one or more backend controllers.

In an example operation of the performance controller 470 depicted in FIG. 4, the application server 466 instantiates the master control module 420, for example, in a bootstrap process in which cloud provider credentials are injected. After the master control module 420 is instantiated, the master control module 420 may be connected to a database. In addition, one or more service level objectives (SLOs), which can be composed by an administrator, may be transmitted to the master control module 420 to be converted to service level configuration information (e.g., a configuration map). The master control module 420 creates the vSphere control module 430 and the database control module 440 in the namespace 462 and creates the local control module 450 in the namespace 464 and passes the service level configuration information to the local control module 450. The metric collection services 468-1, 468-2, 468-3, 468-4, 468-5 of the metrics provider 466 provide application metrics to the master control module 420, the vSphere control module 430, the database control module 440, and the local control module 450. The local control module 450 operates in the namespace 464 and determines whether or not the metrics provided by the metrics provider 466 exceed a predetermined SLO. If the metrics provided by the metrics provider 466 exceed the predetermined SLO, the local control module 450 issues a scale-out action to one or more of the software applications/services 456-1, 456-2, 456-3, 456-4 of the namespace 464. If the metrics provided by the metrics provider 466 do not exceed the predetermined SLO, the local control module 450 may perform no action to the software applications/services 456-1, 456-2, 456-3, 456-4 of the namespace 464. Similarly, the vSphere control module 430 determines whether or not the metrics provided by the metrics provider 466 exceed a predetermined SLO. If the metrics provided by the metrics provider 466 exceed the predetermined SLO, the vSphere control module 430 issues a scale-out action to one or more of the VMs 478 of the vCenter cloud 472. If the metrics provided by the metrics provider 466 do not exceed the predetermined SLO, the vSphere control module 430 may perform no action to the VMs 478 of the vCenter cloud 472. The database control module 440 determines whether or not the metrics provided by the metrics provider 466 exceed a predetermined SLO. If the metrics provided by the metrics provider 466 exceed the predetermined SLO, the database control module 440 issues a scale-out action to one or more of the VMs 478 of the database cloud 482. If the metrics provided by the metrics provider 466 do not exceed the predetermined SLO, the vSphere control module 430 may perform no action to the VMs 478 of the database cloud 482.

Figure 5:
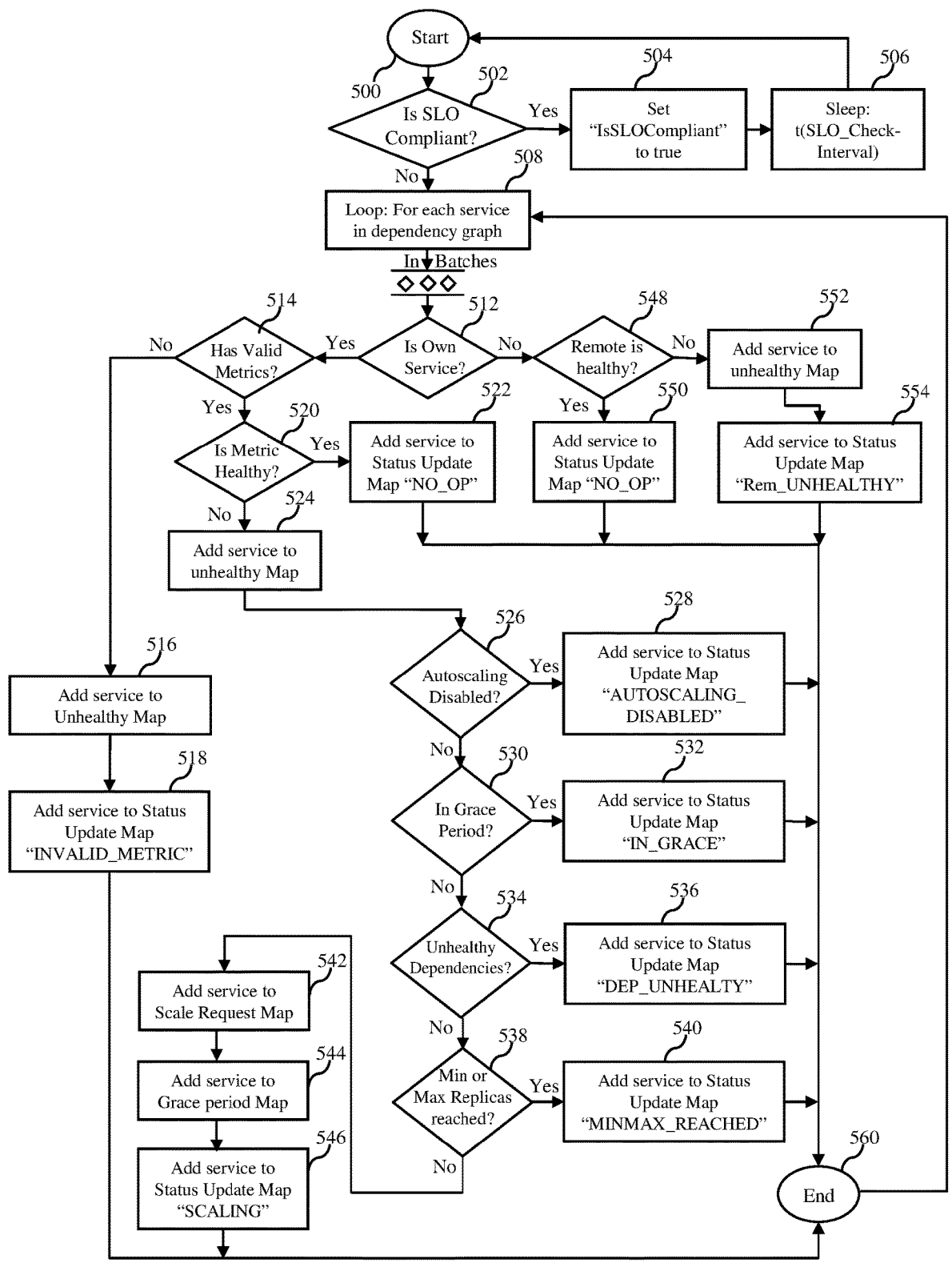
FIG. 5 is a flow diagram of a performance control process that can be implemented in the hybrid cloud system depicted in FIG. 1 in accordance with various aspects of the invention.

FIG. 5 is a flow diagram of a performance control process that can be implemented in the hybrid cloud system 100 depicted in FIG. 1 in accordance with various aspects of the invention. Autoscaling is a well-known and commonly used technique to optimize for resource usage and availability, especially in cloud environments. However, the typical approach of autoscalers, e.g. AWS Autoscaling Groups (ASG), Kubernetes Horizontal Pod Autoscaler, etc. only covers basic requirements and leaves many operational and architectural burden on the end user, e.g., a site reliability engineer or a service owner (Kubernetes is a registered trademark of Cloud Native Computing Foundation®). For example, a typical autoscaling approach leverages application/infrastructure metrics on a per instance basis and does not focus on what really matters to users/consumers: the user experience, i.e., service-level objective (SLO). In addition, a typical autoscaling approach is limited to a specific application/deployment type, e.g., horizontally scalable stateless applications. Further, containers as in Kubernetes or cloud providers, e.g., AWS ASGs/cannot be used across clouds and differ from competing offerings, e.g. Google Cloud™ or Microsoft Azure. Additionally, a typical autoscaling approach targets and focuses on the notion of identical application instances, i.e., not being aware of the full application topology dependencies, which can easily lead to uncoordinated scaling and overload on nonscalable downstream services. Furthermore, a typical autoscaling approach typically does not consider managed services as dependencies, e.g., payment systems or managed database offerings. In addition, a typical autoscaling approach also has enforced limits, which can be easily overrun by the traditional approach of only working on an application instance level instead considering the status of the full dependency graph. Further, a typical autoscaling approach uses global setting, not per application-level settings for scale up/down delays. In addition, a typical autoscaling approach has no concept of federation/global control plane across clouds, leading to provider specific implementations (e.g. AWS ASG allows for predictive scaling whereas Kubernetes does not), which increases cognitive load and thus the potential of misconfiguration on the site reliability engineers/operators when using more than one technology or provider. Further, a typical autoscaling approach does not utilize "learning mode," such that deploying and activating the autoscaler is always intrusive for the application and requires careful upfront planning and continuous testing. In addition, a typical autoscaling approach by design does not consider the status (e.g., health, performance, etc.) of non-scalable resources. The performance control process depicted in FIG. 5 uses a bottom-up graph traversal approach in which downstream services are protected from being overloaded due to upstream scaling because the performance control process is aware of the dependencies between the software entities. In addition, the performance control process depicted in FIG. 5 can improve or even optimize SLO enforcement (e.g. performance, availability, etc.) as well as efficiency (e.g., resource usage). For example, the performance control process depicted in FIG. 5 can be used to improve or optimize software entity cost without negatively impacting SLO. Further, the performance control process depicted in FIG. 5 uses parallel and batch scaling for software services without direct or transient dependencies to improve overall throughput and responsiveness. Additionally, the performance control process depicted in FIG. 5 enables fine-grained (per service) control over scaling policies, including the scaling algorithm (e.g. none, performance, scheduled, efficiency, etc.), metrics, thresholds, scale up/down delays ("grace period"). Further, the performance control process depicted in FIG. 5 can operate across cluster/datacenter (cloud) boundaries and is capable of considering dependencies that are not managed directly, e.g. by a 3rd party (SaaS), which is important because thresholds/limits can be enforced on these services, causing queuing and thus latency increases in distributed architectures. In addition, the performance control process depicted in FIG. 5 can be deployed in "learning mode" where the performance control process is non-disruptive to existing deployments. Specifically, the performance control process can report actions based on the metrics and status observed, but not take any action on the services (i.e., No Operation), which is useful in scenarios where users want to gradually deploy a performance controller without any impact on current workloads. Further, the performance control process depicted in FIG. 5 has a pluggable architecture that can be used to provide custom performance control modules. In addition, the performance control process depicted in FIG. 5 can support event streams to easily integrate downstream consumers, e.g. VMware Wavefront™ for causality tracking and root-cause analysis. Further, the performance control process depicted in FIG. 5 can be integrated with site reliability engineering (SRE) tooling to reduce cognitive load on the operator and enable closed loop analysis/troubleshooting. Additionally, the performance control process depicted in FIG. 5 can support the planning aspect in defining concise and achievable SLOs between multiple teams, e.g. site reliability engineers and application developers by providing metrics and recommendations. Further, the performance control process depicted in FIG. 5 can provide uniform user experience and capabilities independent from an underlying cloud platform.

In the flow diagram shown in FIG. 5, the performance control process starts from step 500. At step 502, a performance controller (e.g., the performance controller 170 depicted in FIG. 1, the performance controller 270 depicted in FIG. 2, the performance controller 370 depicted in FIG. 3, or the performance controller 470 depicted in FIG. 4) determines whether an SLO of an application satisfies a predefined threshold. For example, the performance controller determines whether the response time of the application is below a certain threshold. If the SLO of an application satisfies a predefined threshold, the "IsSLOCompliant" flag of the application is set to logic true at step 504 and the SLO of the application is rechecked after waiting for a certain time interval at step 506. If the SLO of an application does not satisfy the predefined threshold, the performance controller checks each service in the dependency graph of the application at step 508. In some embodiments, the services in the application are checked in batches that can be executed in parallel to each other.

At step 512, the performance controller determines whether a specific service is a service that can be managed or controlled by the performance controller. If the specific service is a service that can be managed or controlled by the performance controller, the performance controller subsequently determines whether there are valid metrics for the specific service at step 514. If there are no valid metrics for the specific service, the performance controller adds the specific service to a "unhealthy map" that represents unhealthy services at step 516. Subsequently, the performance controller adds the specific service to a status update map "INVALD_METRIC" that represents services without valid metrics at step 518 and the performance control process for the specific service ends at step 560.

If there are valid metrics for the specific service, the performance controller subsequently determines whether the metrics indicate that the specific service is healthy at step 520. If the specific service is healthy, the performance controller adds the specific service to a status update map "NO_OP" representing healthy services that do not need scaling operations at step 522. If the specific service is unhealthy, the performance controller adds the specific service to a "unhealthy map" that represents unhealthy services at step 524. Subsequently, the performance controller determines whether autoscaling option for the specific service is disabled at step 526. If autoscaling option for the specific service is disabled, the performance controller adds the specific service to a status update map "AUTOSCALING_DISABLED" that represents services with autoscaling option disabled at step 528 and the performance control process for the specific service ends at step 560. If autoscaling option for the specific service is not disabled (e.g., enabled), the performance controller determines whether the specific service is in adjustment grace period at step 530.

If the specific service is in adjustment grace period, the performance controller adds the specific service to a status update map "IN_GRACE" that represents services in adjustment grace period at step 532 and the performance control process for the specific service ends at step 560. If the specific service is not in adjustment grace period, the performance controller determines whether the specific service has any unhealthy dependent service at step 534. If the specific service has at least one unhealthy dependent service, the performance controller adds the specific service to a status update map "DEP_UNHEALTY" that represents services with unhealthy dependent services at step 536 and the performance control process for the specific service ends at step 560. If the specific service has no unhealthy dependent service, the performance controller determines whether the minimum or maximum number of replicas for the specific service has been reached at step 538.

If the minimum or maximum number of replicas for the specific service has been reached, the performance controller adds the specific service to a status update map "MIN-MAX_REACHED" that represents services whose minimum or maximum number of replicas has been reached at step 540 and the performance control process for the specific service ends at step 560. If the minimum or maximum number of replicas for the specific service has not been reached, the performance controller adds the specific service to a "Scale Request" map at step 542, adds the specific service to a "Grace Period" map at step 544, and add the specific service to a status update map "SCALING" that represents services to be scaled at step 546 and the performance control process for the specific service ends at step 560.

If the specific service is not a service that can be managed or controlled by the performance controller (step 512), the performance controller subsequently determines whether a remote copy of the specific service is healthy at step 548. If the remote copy of the specific service is healthy, the performance controller adds the specific service to a status update map "NO_OP" representing healthy services that do not need scaling operations at step 550. If the remote copy of the specific service is not healthy, the performance controller adds the specific service to a "unhealthy map" that represents unhealthy services at step 552, adds the specific service to a status update map "Update Map "Rem_UN-HEALTHY" representing services with remote unhealthy services at step 554, and the performance control process for the specific service ends at step 560.

Figure 6:
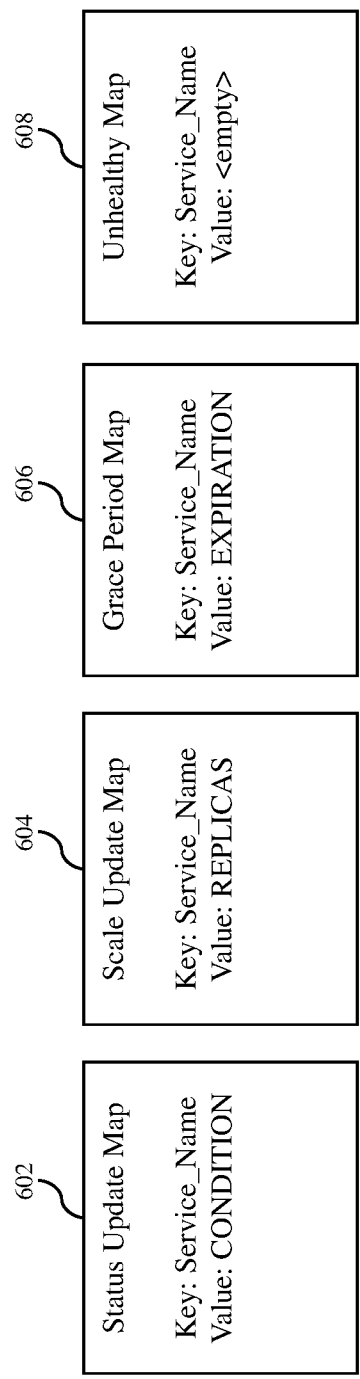
FIG. 6 depicts some example of the status update map, scale update map, grace period map, and unhealthy map that can be used in the performance control process of FIG. 5.

FIG. 6 depicts some examples of the status update map, scale update map, grace period map, and unhealthy map that can be used in the performance control process of FIG. 5. In the embodiment depicted in FIG. 6, the status update map 602 contains at least one entry of the service name of a software service with the condition of the software service, the scale update map 604 contains at least one entry of the service name of a software service with the replica information of the software service, the grace period map 606 contains at least one entry of the service name of a software service with expiration information of a scaling grace period of the software service, and the unhealthy map 608 contains at least one entry of the service name of a software service whose operational metrics indicate that the software service is unhealthy.

Figure 7:
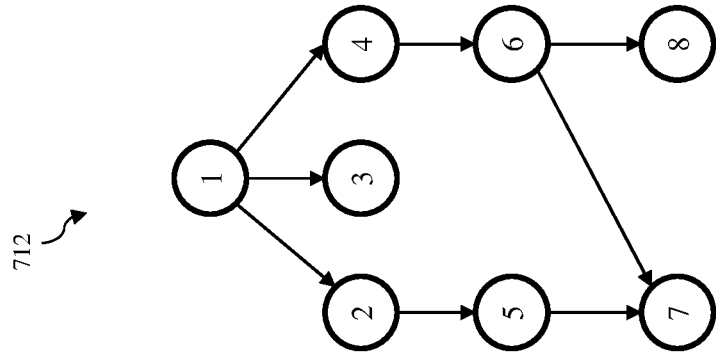
FIG. 7 depicts an application that can be control by the performance control process of FIG. 5.

FIG. 7 depicts an application 712 whose performance can be control by the performance control process of FIG. 5. In the embodiment depicted in FIG. 7, the application 712 includes eight software services, 1, 2, ..., 8, which can be processed in batches or in parallel to each other. As identified in batch map (BMAP) 720, software services 8, 3, 7 can be processed in batches, software services 6, 5 can be processed in batches, software services 4, 2 can be processed in batches and software service 1 can be processed by itself. As identified in dependency map (DMAP) 730, software service 1 is dependent upon software services 2, 3, 4. Software service 2 is dependent upon software service 5, which in turn is dependent upon software service 7. Software service 4 is dependent upon service 6, which in turn is dependent upon software services 7 and 8. Software services 7, 3, 8 are not dependent upon any other software service.

Figure 8:
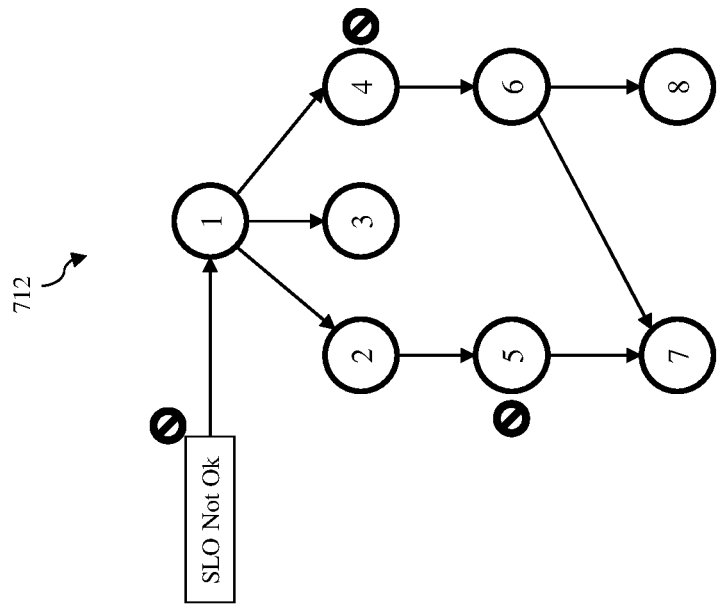
FIG. 8 depicts the application depicted in FIG. 7 to which a scale action is performed by the performance control process of FIG. 5.
Figure 8:
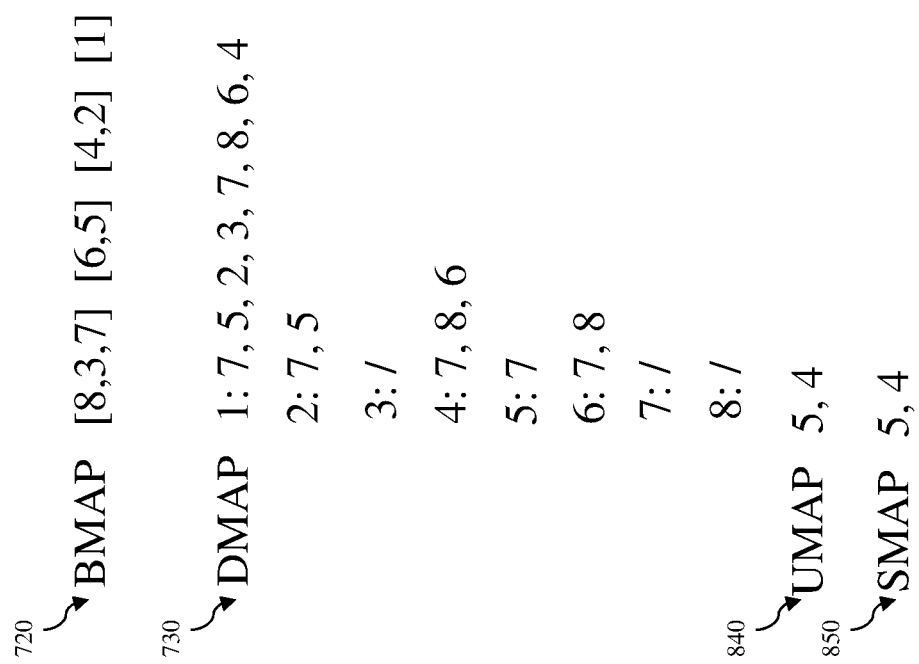

FIG. 8 depicts the application 712 depicted in FIG. 7 to which a scale action is performed by the performance control process of FIG. 5. In the embodiment depicted in FIG. 8, an SLO of the application 712 does not satisfy a predefined threshold. For example, the response time of the application 712 is above a predefined response time threshold. Based on operational metrics of software services, 1, 2, ..., 8, software services 5, 4 are identified as being unhealthy, as shown in unhealthy map (UMAP) 840. Because software services 6, 7, 8 upon which software services 4, 5 are dependent are healthy, software services 5, 4 are scaled to improve performance of the application 712, as shown in scale map (SMAP) 850.

Figure 9:
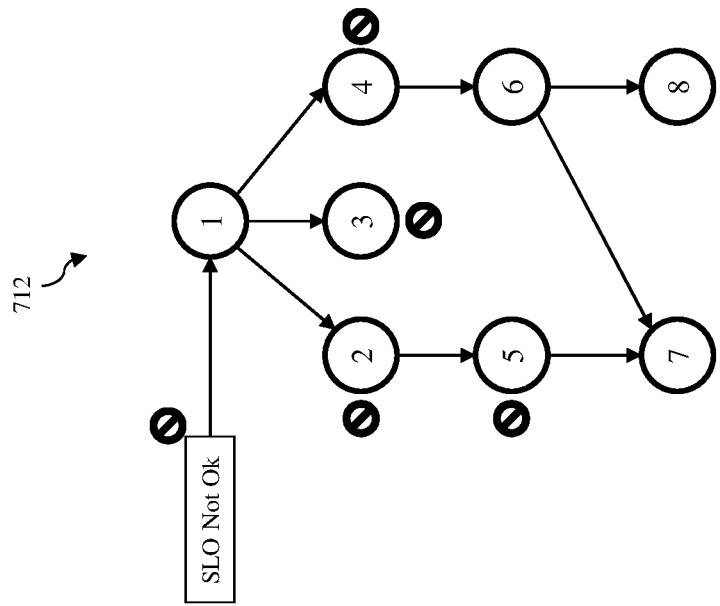
FIG. 9 depicts the application depicted in FIG. 7 to which another scale action is performed by the performance control process of FIG. 5.

FIG. 9 depicts the application 712 depicted in FIG. 7 to which another scale action is performed by the performance control process of FIG. 5. In the embodiment depicted in FIG. 9, an SLO of the application 712 does not satisfy a predefined threshold. For example, the response time of the application 712 is above a predefined response time threshold. Based on operational metrics of software services, 1, 2, ..., 8, software services 5, 2, 3, 4 are identified as being unhealthy, as shown in unhealthy map (UMAP) 940. Because software service 2 is dependent upon which software service 5, which is also unhealthy, software services 5, 3, 4 are scaled to improve performance of the application 712, as shown in scale map (SMAP) 950.

Figure 10:
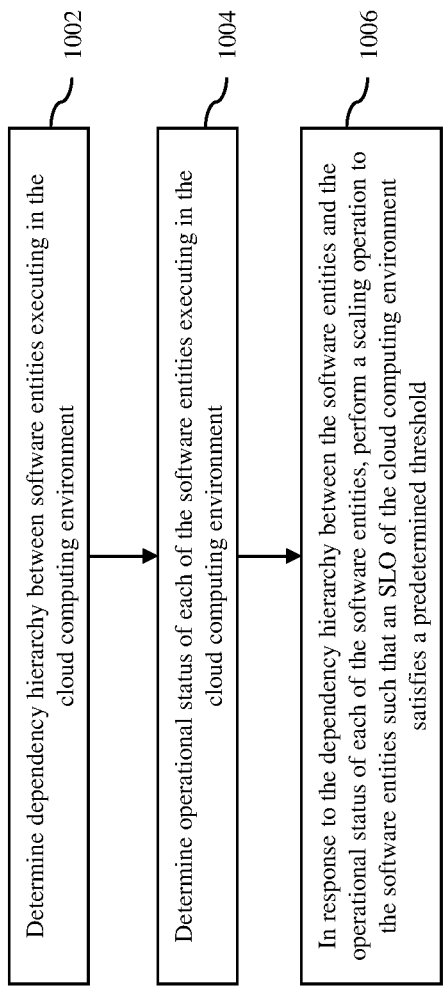
FIG. 10 is a flow diagram of a computer-implemented method for performance control in a cloud computing environment in accordance with an embodiment of the invention.

A computer-implemented method for performance control in a cloud computing environment in accordance with an embodiment of the invention is described with reference to a flow diagram of FIG. 10. At block 1002, dependency hierarchy between software entities executing in the cloud computing environment is determined. At block 1004, operational status of each of the software entities executing in the cloud computing environment is determined. At block 1006, in response to the dependency hierarchy between the software entities and the operational status of each of the software entities, a scaling operation to the software entities is performed such that an SLO of the cloud computing environment satisfies a predetermined threshold.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for performance control in a cloud computing environment, the method comprising:
    determining dependency hierarchy between a plurality of software entities executing in the cloud computing environment, wherein a performance of at least one of the software entities that is dependent upon another entity of the software entities is affected by a performance of the another software entity and wherein an output of the another software entity is an input of the at least one of the software entities;
    determining operational status of each of the software entities executing in the cloud computing environment, including identifying multiple software entities of the software entities as unhealthy software entities that are dependent on each other; and
    in response to the dependency hierarchy between the software entities and the operational status of each of the software entities, performing a scaling operation to the software entities such that a service-level objective (SLO) of the cloud computing environment satisfies a predetermined threshold, including performing the scaling operation to only some of the unhealthy software entities.

2. The method of claim 1, wherein the software entities execute in different clouds of the cloud computing environment.

3. The method of claim 1, wherein in response to the dependency hierarchy between the software entities and the operational status of each of the software entities, performing the scaling operation to the software entities such that the SLO of the cloud computing environment satisfies the predetermined threshold comprises performing the scaling operation to one of the software entities that is located at bottom of the dependency hierarchy between the software entities.

4. The method of claim 1, wherein determining the operational status of each of the software entities executing in the cloud computing environment comprises identifying a first software entity and a second software entity of the software entities executing in the cloud computing environment as unhealthy software entities, and wherein the first software entity is dependent upon the second software entity.

5. The method of claim 4, wherein in response to the dependency hierarchy between the software entities and the operational status of each of the software entities, performing the scaling operation to the software entities such that the SLO of the cloud computing environment satisfies the predetermined threshold comprises only performing the scaling operation to the second software entity.

6. The method of claim 1, further comprising determining whether at least one of the software entities executing in the cloud computing environment is in a scaling grace period.

7. The method of claim 6, further comprising exempting at least one of the software entities that is in the scaling grace period from the scaling operation.

8. The method of claim 1, wherein determining the dependency hierarchy between the software entities executing in the cloud computing environment comprises generating a dependency map between the software entities.

9. The method of claim 1, wherein determining the operational status of each of the software entities executing in the cloud computing environment comprises generating a health map of the software entities based on a plurality of metrics of the software entities.

10. A non-transitory computer-readable storage medium containing program instructions for performance control in a cloud computing environment, wherein execution of the program instructions by one or more processors causes the one or more processors to perform steps comprising:
    determining dependency hierarchy between a plurality of software entities executing in the cloud computing environment, wherein a performance of at least one of the software entities that is dependent upon another entity of the software entities is affected by a performance of the another software entity and wherein an output of the another software entity is an input of the at least one of the software entities;
    determining operational status of each of the software entities executing in the cloud computing environment, including identifying multiple software entities of the software entities as unhealthy software entities that are dependent on each other; and
    in response to the dependency hierarchy between the software entities and the operational status of each of the software entities, performing a scaling operation to the software entities such that a service-level objective (SLO) of the cloud computing environment satisfies a predetermined threshold, including performing the scaling operation to only some of the unhealthy software entities.

11. The non-transitory computer-readable storage medium of claim 10, wherein the software entities execute in different clouds of the cloud computing environment.

12. The non-transitory computer-readable storage medium of claim 10, wherein in response to the dependency hierarchy between the software entities and the operational status of each of the software entities, performing the scaling operation to the software entities such that the SLO of the cloud computing environment satisfies the predetermined threshold comprises performing the scaling operation to one of the software entities that is located at bottom of the dependency hierarchy between the software entities.

13. The non-transitory computer-readable storage medium of claim 10, wherein determining the operational status of each of the software entities executing in the cloud computing environment comprises identifying a first software entity and a second software entity of the software entities executing in the cloud computing environment as unhealthy software entities, and wherein the first software entity is dependent upon the second software entity.

14. The non-transitory computer-readable storage medium of claim 13, wherein in response to the dependency hierarchy between the software entities and the operational status of each of the software entities, performing the scaling operation to the software entities such that the SLO of the cloud computing environment satisfies the predetermined threshold comprises only performing the scaling operation to the second software entity.

15. The non-transitory computer-readable storage medium of claim 10, wherein the steps further comprise determining whether at least one of the software entities executing in the cloud computing environment is in a scaling grace period.

16. The non-transitory computer-readable storage medium of claim 15, wherein the steps further comprise exempting at least one of the software entities that is in the scaling grace period from the scaling operation.

17. A system for performance control in a cloud computing environment, the system comprising:
   memory; and
   one or more processors configured to:
      determine dependency hierarchy between a plurality of software entities executing in the cloud computing environment, wherein a performance of at least one of the software entities that is dependent upon another entity of the software entities is affected by a performance of the another software entity and wherein an output of the another software entity is an input of the at least one of the software entities;
      determine operational status of each of the software entities executing in the cloud computing environment and identify multiple software entities of the software entities as unhealthy software entities that are dependent on each other; and
      in response to the dependency hierarchy between the software entities and the operational status of each of the software entities, perform a scaling operation to the software entities such that a service-level objective (SLO) of the cloud computing environment satisfies a predetermined threshold, wherein the scaling operation is performed to only some of the unhealthy software entities.

18. The system of claim 17, wherein the software entities execute in different clouds of the cloud computing environment.

19. The system of claim 17, wherein the one or more processors are further configured to perform the scaling operation to one of the software entities that is located at bottom of the dependency hierarchy between the software entities.

20. The system of claim 17, wherein the one or more processors are further configured to identify a first software entity and a second software entity of the software entities executing in the cloud computing environment as unhealthy software entities, wherein the first software entity is dependent upon the second software entity, and wherein the one or more processors are further configured to only perform the scaling operation to the second software entity.

* * * * *